United States Patent [19]

Hovan et al.

[11] Patent Number: 4,820,116
[45] Date of Patent: Apr. 11, 1989

[54] TURBINE COOLING FOR GAS TURBINE ENGINE

[75] Inventors: Edward J. Hovan; Guilford E. Stephens, both of Manchester; Samuel C. Peele, Glastonbury, all of Conn.

[73] Assignee: United Technologies Corporation, Hartford, Conn.

[21] Appl. No.: 99,180

[22] Filed: Sep. 18, 1987

[51] Int. Cl.[4] .............................................. F01D 5/18
[52] U.S. Cl. ................................... 415/115; 415/180; 416/95
[58] Field of Search ............ 415/115, 116, 180, 199.5; 416/95, 198 A

[56] References Cited

U.S. PATENT DOCUMENTS

| | | |
|---|---|---|
| 2,988,325 | 6/1961 | Dawson .............................. 415/110 |
| 3,572,966 | 3/1971 | Borden ................................. 416/95 |
| 3,575,528 | 4/1971 | Beam, Jr. ............................ 415/115 |
| 3,734,639 | 5/1973 | Short .................................... 416/95 |
| 4,213,738 | 7/1980 | Williams ............................ 415/115 |
| 4,302,148 | 11/1981 | Tubbs ................................. 415/115 |
| 4,645,424 | 2/1987 | Peters ............................. 416/198 A |
| 4,685,863 | 8/1987 | McLean ............................... 416/95 |
| 4,701,105 | 10/1987 | Cantor et al. ....................... 416/95 |
| 4,730,982 | 3/1988 | Kervistin ........................ 416/198 A |

Primary Examiner—Robert E. Garrett
Assistant Examiner—John T. Kwon
Attorney, Agent, or Firm—Edward L. Kochey, Jr.

[57] ABSTRACT

A gas turbine engine cooling system has cooling air cooling in order, the first stage disk (50) and blades (22), the second stage vanes (24), and the second stage air seal (82). Air passes to the second stage vane from the rotor through a reaction nozzle (62) effecting a reaction stage adding energy to the rotor and cooling the air.

2 Claims, 2 Drawing Sheets

TURBINE COOLING FOR GAS TURBINE ENGINE

DESCRIPTION

1. Technical Field

The invention relates to gas turbine engines and in particular to cooling of turbine parts.

2. Background Art

In gas turbine engines it has become common to cool the turbine parts with cooling air to permit the use of gas temperatures higher than the material would otherwise allow. Since such cooling air does not pass through the full thermodynamic cycle it represents a loss of power and efficiency of the engine.

Often interstage bleed air is used to avoid the full air compression penalty. This often requires the use of external piping. External piping is subject to breaking and therefore requires multiple pipes. This leads to complex arrangements to obtain proper distribution and produces concomitant interference problems with other equipment.

DISCLOSURE OF THE INVENTION

It is an object of the invention to provide stator vane cooling at a temperature and pressure similar to interstage bleed air systems without the use of external pipes.

It is a further object to transfer energy from the cooling air to the rotor, thereby recovering energy to the engine and decreasing the temperature of the cooling air.

It is a further object to serially cool the gas turbine parts with the most critical part being cooled at an upstream location with respect to the cooling flow so that failure of a relatively minor part will not lead to catastrophe failure of a more important part.

Full pressure cooling air from the compressor discharge is passed through a stator nozzle which is angled in the direction of rotation of the rotor and supplies cooling air to the area of the first stage rotor disk. Air passes outwardly from this location to the first stage rotor blade supply cavity. A portion of the air passes through the blades and into the gas stream to cool the blades while the remainder of the air passes on through the cavity to the rotor disk rear.

This latter portion is then introduced between teeth of the interstage labyrinth seal which seals around the second stage stator vane. From the plenum thus formed the cooling air passes through openings in the stator vanes to cool these vanes. A portion of this air may be discharged into the main flow at this time. The remainder passes through the vanes where it is then passed further downstream to cool the second stage outer air seal located in the stator closely surrounding the outer edge of the second stage rotor blades.

BEST MODE FOR CARRYING OUT THE INVENTION

Figure 1:
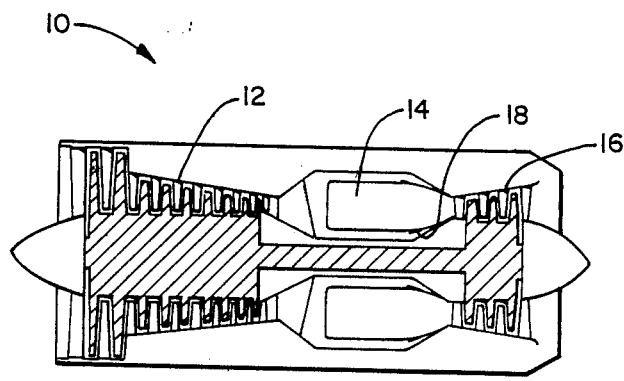
FIG. 1 is a general schematic of a gas turbine engine.
Figure 2:
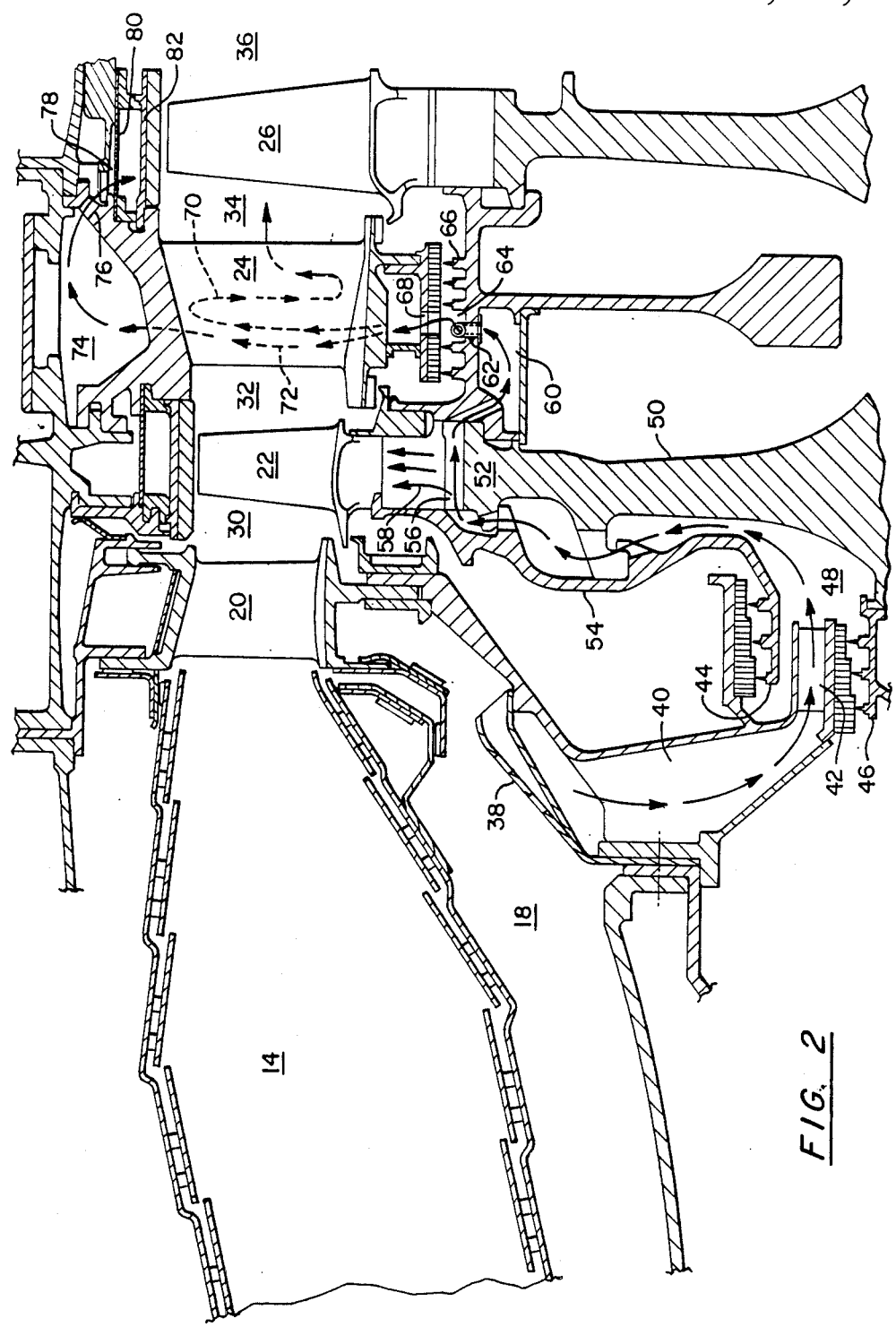
FIG. 2 is a detail of the coolant flowpath.

The gas turbine engine 10 of FIG. 1 includes an axial flow compressor 12, a combustor 14 and a gas turbine 16. The combustor is surrounded by a combustor cooling chamber 18 which contains air at high pressure discharged from the compressor 12. Air for cooling the gas turbine parts according to the flowpath illustrated in FIG. 2 is taken from a downstream location of the combustor cooling chamber where it is physically located close to the gas turbine 16.

The main flow passes from combustor 14 through first stage vanes 20, first stage rotor blades 22, second stage stator vanes 24 and second stage rotor blades 26. With an initial pressure in combustor 14 as well as combustor cooling chamber 18 at 100 percent it is reduced to 65 percent pressure at location 30 downstream of the first stage stator vanes 20. After passing through the first stage rotor blades 22 it is reduced to 50 percent at location 32, and on passing through vanes 24 is reduced to 30 percent at location 34. After passing through second stage blades 26 it is reduced to 20 percent of the initial pressure at location 36, from which location it passes through the low pressure turbine (not shown).

Cooling air passes from chamber 18 around dust shield 38 through conduit 40 and through stator nozzles 42. These nozzles are angled to direct the flow in the direction of rotation of the gas turbine rotor. The air enters through the nozzles located between labyrinth seals 44 and 46 into a plenum 48 adjacent the rotor disk 50, which disk supports through its rim, 52, the first stage blades 22. In passing through the nozzles 42 the air pressure is reduced to 65 percent of the initial pressure in chamber 18, or substantially the same as the pressure at location 30. Accordingly, very little pressure differential exists across labyrinth seal 44. The cooling air is reduced in temperature as it passes through nozzle 42 thereby reducing the air temperature from that existing because of the full compression of the cooling air in the compressor.

The cooling airflow passes outwardly through the turbine rotor between the disk 50 and cover plate 54 to the area of rim 52. Openings 56 between the rim and blade roots permit the passage of cooling air therethrough to cool these parts. A portion of the cooling air 58 passes outwardly through passages in blades 22 exiting therefrom into the main gas flow thereby directly cooling blades 22.

The cooling airflow through the openings 56 continues into plenum 60 of the rotor from which it passes through a nozzle 62 into a seal plenum 64 located between the teeth of labyrinth seal 66. This nozzle is angled to direct the airflow opposite to the direction of rotation of the turbine, and is thereby a reaction stage which transfers energy to the rotor while permitting the work to be removed from the airflow, and further reducing the temperature and pressure of the airflow. The pressure within plenum 64 is approximately 50 percent of the initial pressure which closely approximates the pressure of 50 percent upstream of vane 24 at area 32 and is somewhat above the 30 percent pressure downstream of the same vane.

This cooling air passes through opening 68 in the stator, after which a portion of the air travels through a sinuous flowpath 70 within the vanes 24, while the remainder of the flow passes through the vanes in flowpath 72 to a plenum 74.

From this plenum the air passes through opening 76 into a plenum 78 located upstream of plate 80. This plate contains a plurality of small holes located therethrough whereby the cooling air passes through the plate impinging against and cooling the outer air seal 82.

The rotor blades 22 are the most critical of the components cooled by the described cooling circuit. Should the other components fail, cooling of these blades will continue. Similarly, cooling of the stator vanes 24 is more critical than the seal 82. Failure of the seal will not result in loss of cooling of the vanes.

While the cooling air is taken from a high pressure level, it is cooled by expansion and work is added to the rotor from the air. No external piping is required for the cooling circuit.

We claim:

1. A gas turbine engine having:

a compressor;

a first stage rotor blade set having a cooling flowpath through the blades;

a first stage rim structure supporting said first stage rotor blades;

a first stage disk supporting said rim structure;

a second stage stator vane set having cooling flowpaths through the vanes;

a second stage interstage labyrinth seal sealing around said second stage stator vane set;

a second stage rotor blade set;

stator nozzles mounted in said stator adjacent to said first stage disk and angled to direct airflow passing therethrough in the direction of rotation of said disk;

means for conveying cooling air from substantially a compressor outlet to said stator nozzles;

said rim structure having cooling airflow openings therethrough from an upstream side to a downstream side of said disk;

means for conveying airflow through said rotor from said stator nozzles to said cooling airflow openings in said rim structure;

nozzles secured to said rotor, angled to direct flow therethrough opposite the direction of rotation of said rotor and located to discharge air into a plenum between seal sections of said second stage interstage labyrinth seal; and the cooling flowpath through said second stage vanes being in fluid communication with said seal plenum.

2. A gas turbine engine as in claim 1 also having:

a second stage outer seal located on said stator close to the outer edge of said second stage rotor blade set; and means for conveying cooling air from said stator vanes to said outer air seal.

* * * * *

UNITED STATES PATENT AND TRADEMARK OFFICE
CERTIFICATE OF CORRECTION

PATENT NO. : 4,820,116

DATED : April 11, 1989

INVENTOR(S) : Edward J. Hovan et al

It is certified that error appears in the above-identified patent and that said Letters Patent is hereby corrected as shown below:

Claim 1, Column 3, Line 8  After "engine" insert --including a rotor and a stator,--

Signed and Sealed this

Third Day of March, 1992

Attest:

Attesting Officer

HARRY F. MANBECK, JR.

Commissioner of Patents and Trademarks